March 24, 1931.  S. R. HINDS  1,797,575
BRAKE AND CLUTCH PEDAL INTERLOCKING MECHANISM
Filed March 30, 1929  2 Sheets-Sheet 1
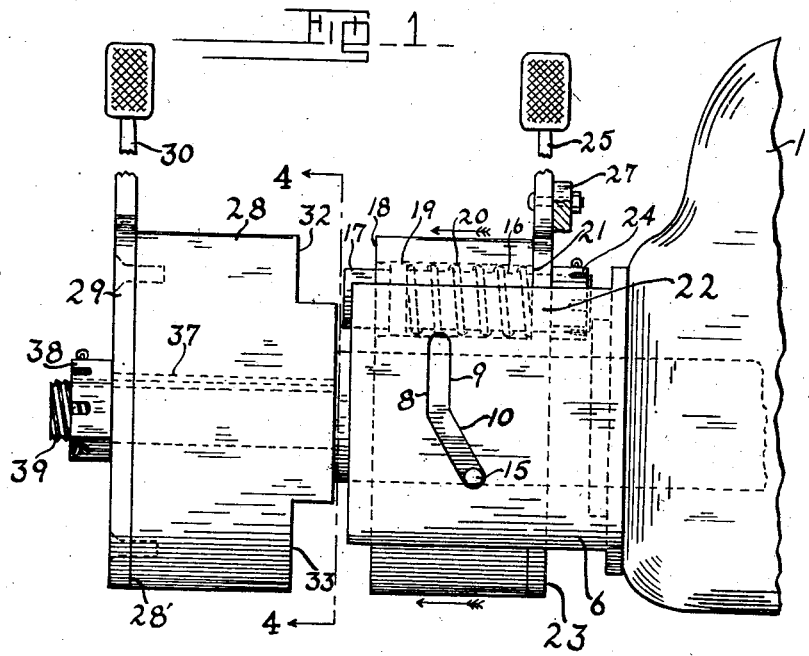
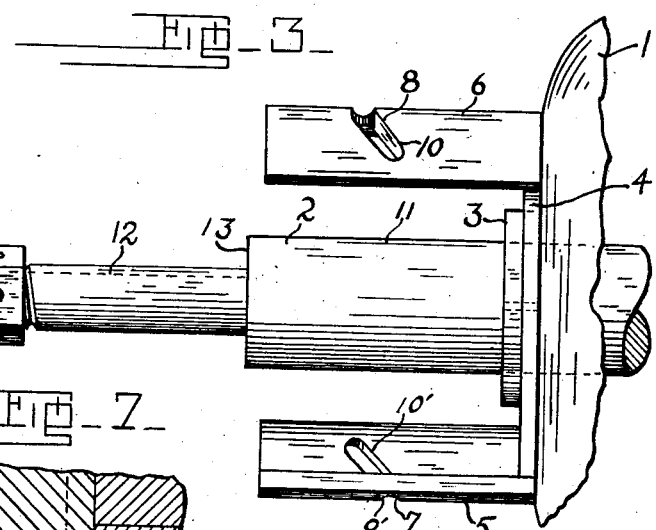
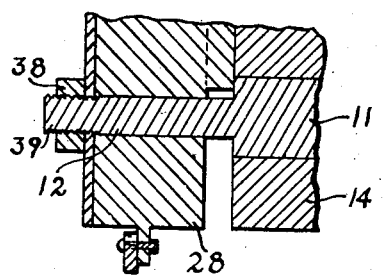
Inventor
Sidney R. Hinds
By
Attorney

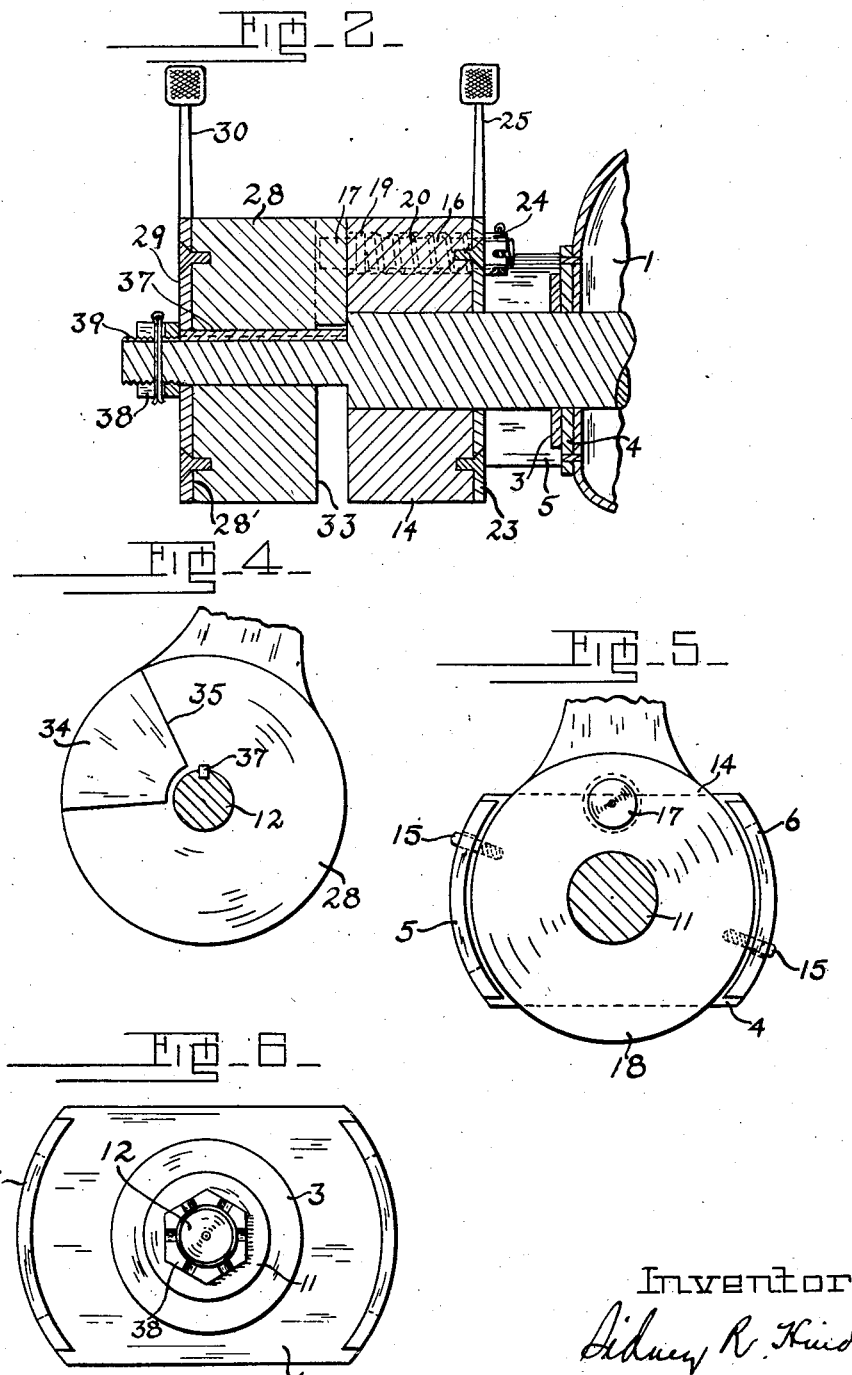

Patented Mar. 24, 1931

1,797,575

UNITED STATES PATENT OFFICE

SIDNEY R. HINDS, OF THE UNITED STATES ARMY, FORT LEONARD WOOD, MARYLAND

BRAKE AND CLUTCH PEDAL INTERLOCKING MECHANISM

Application filed March 30, 1929. Serial No. 351,448.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

This invention generically appertains to the control for the clutch and brake assemblies of self-propelled vehicles, more especially it is directed to a mechanism adapted to engage and disengage the clutch and brake pedals at a predetermined point in the path of their throw.

One of the objects of this invention is to provide a mechanism of the character specified by means of which the clutch and brake pedals are interconnected when the clutch is released and the service brake applied, thus permitting the operator to use but one foot to hold both pedals in depressed position.

Another object of this invention is to provide a device through the instrumentality of which the clutch foot of the operator may serve to gradually release the service brake and clutch pedals while the foot normally required to operate the brake pedal is free to actuate the accelerator, whereby rearward movement of the vehicle is prevented with its consequent danger to the pedestrian or nearby vehicles.

Another object of this invention is to provide a clutch and pedal interlocking mechanism readily applicable to the standard automotive equipment without material alteration thereof and which will not interfere to the slightest extent with the normal operation of either clutch or brake foot pedals.

Another object of this invention is to provide a device of the type indicated which will function to interlock the foot pedals when the clutch is released and the brakes applied, whether these operations occur simultaneous or successively.

Other objects of this invention are to provide a clutch pedal interlocking mechanism, simple in construction, inexpensive to produce, positive in action, readily applicable to existing automotive structure or susceptible of manufacture as standard equipment and finally a device which will reduce clutch wear due to stopping and completely eliminate the difficulties now attending the starting of self propelled vehicles from a stationary position on a grade.

With these and other objects in view this invention consists in certain novel details of construction, combination and arrangement of parts to be more particularly hereinafter set forth and claimed.

Briefly stated, this invention comprises a clutch control shaft, a pair of inner and outer annular bearing members, adjacently mounted in laterally spaced relation thereon, the outer member being connected to the shaft and functioning to operate the clutch assembly, the inner member being interconnected with the brake assembly and positioned on the shaft for both rotary and longitudinal movement with respect thereto, foot pedals carried by the bearing members, means for actuating the inner member longitudinally of the shaft toward the outer member simultaneous with its rotary movement in the application of service brakes, a yieldable plunger extending from the inner face of the inner member and adapted to engage a shoulder on the inner face of the outer member, which is positioned for such engagement when said outer member has been rotated to release the clutch assembly.

Referring more particularly to the accompanying drawings in which corresponding parts are indicated by similar reference characters:

Fig. 1 is a longitudinal section illustrating the components of the interlocking mechanism in operative relation, Fig. 2 is a front elevation of the clutch and foot pedal interlocking mechanism illustrating the position of the parts with clutch thrown in and service brakes applied, Fig. 3 is a fragmentary detail in elevation illustrating the clutch shaft construction and the mounting of the slotted guide plates, the slots of which are adapted to cooperate with the pins carried by the inner bearing member, Fig. 4 is a fragmentary section taken on the line 4—4 of Fig. 1 looking in the direction of the arrows, Fig. 5 is a similar view looking in a direction opposite to that indicated by the arrows in Fig. 1, Fig. 6 is a front elevation of the structure shown in Fig. 3, the clutch housing being omitted, and Fig. 7 is a sectionized detail illustrating the clutch assembly loosely mounted on the shaft.

With the present standard automotive equipment when traffic conditions necessitate a stop on a grade, to start again it is necessary for the operator to gradually release both brake and clutch pedals and resort to the hand throttle for the requisite motor acceleration, as both feet are occupied in engaging the clutch and gradually releasing the brake. This is more or less of a difficult feat and not infrequently results in stalling the engine or permitting a dangerous rearward movement of the vehicle and it is therefore the aim and purpose of this invention to provide a mechanism which when the clutch is fully released and the service brake applied, effects an interconnection between the clutch and foot pedals so that the operator may control both pedals with the clutch foot, the other foot being free to operate the accelerator for imparting the necessary acceleration to the motor for starting purposes.

In the illustrated embodiment characterizing this invention there is shown a portion of the clutch housing (1) through which projects the extremity of a clutch control shaft (2) functioning to actuate the clutch assembly (not shown).

Mounted on the shaft (2) between flange (3) and the side of the clutch housing (1) is an anchoring plate (4) having suitable openings for the passage of fastening elements by which it is securely attached to the clutch housing.

Integral with the extremities of the anchoring plate and projecting laterally in parallelism on opposite sides of the shaft (2) are a pair of arcuate guide plates (5) and (6) having guide slots (7) and (8).

Guide slot (8) extends for a portion of its length as at (9) in a plane parallel with the vertical axis of guide plate (6) and for its remaining length (10) inwardly toward the clutch housing as clearly shown in Fig. 1 of the drawings, while the guide slot (7) in plate (5) has a portion (9') extending in a plane parallel to the vertical axis of said plate (5) and the remaining portion projecting at an angle in the direction of the outer end of the plate as at (10').

At a point spaced from its outer extremity the shaft (2) is reduced to form the sections (11) and (12) and to provide annular shoulder (13). Mounted on the section (11) of shaft (2) is an annular bearing (14) positioned for free rotary and longitudinal movement with respect to the shaft for a purpose hereinafter to appear.

At diametrically opposite points on its periphery annular bearing (14) is provided with a pair of radially extending guide pins (15) adapted to project through the slots (7) and (8) in guide plates (5) and (6) for the purpose of actuating the bearing block longitudinally of the shaft as said bearing block is rotated thereabout.

Extending transversely through the upper portion of the bearing block (14) is an annular bore (16) in which is slidably positioned a locking plunger (17), the free end of which is adapted to project from the outer surface (18) of the bearing block as clearly shown in Figs. 1 and 5 of the drawing. The plunger (17) at a point adjacent its outer end is formed with a collar (19) constituting an abutment for one end of a compression spring (20) located within the bore and encircling the plunger. The opposite end of the spring rests against the inner surface of pedal plate (23) suitably affixed to bearing (14). The inner end of the plunger which projects through pedal plate (23) is threaded for the reception of a nut (24) serving to limit the extent to which plunger (17) projects from the outer face (18) of the bearing.

Integral with the pedal plate (23) is a pedal (25) which is connected with a brake rod (27) controlling the brake assembly (not shown) so that as the pedal is depressed the service brakes will be applied.

For the sake of convenience in description the structure just described and forming one part of the interlocking mechanism will hereinafter be referred to as the brake pedal assembly.

Positioned on section (12) of shaft (2) is an annular bearing member (28), to the outer face (28') of which is affixed a pedal plate (29) having integral therewith pedal (30) as clearly shown in Figs. 1 and 2 of the drawings. The inner face (32) of bearing member (28) is cut away as at (33) to provide a segmental section (34), and forms the plunger engaging shoulder (35) for a purpose hereinafter to appear.

Bearing (28) is keyed to the clutch control shaft (2) by a key (37) situated in suitable keyways formed in the bearing member and shaft as clearly shown in Fig. 4. A nut (38) positioned on the threaded extremity (39) of the shaft enables the face of segment (35) of the bearing member to seat snugly against the shoulder (13) of the shaft (2) as will be understood without further discussion.

To further facilitate discussion, this invention, the bearing member (28) and its associated parts will hereinafter be referred to as the clutch pedal assembly.

Having outlined the structural details of this invention, its operation is as follows:

With both foot pedals (25) and (30) in their normal position, that is to say, with the clutch in and the service brakes released, the plunger (17) of the brake pedal assembly is positioned, so that it would, if said assembly were moved longitudinally of the shaft, just clear the shoulder (35) of the clutch pedal assembly.

The assemblies being arranged on the clutch control shaft as stated, when the clutch pedal is depressed to throw out the clutch, the shoulder (35) of the brake pedal assembly is advanced so as to position the surface of segment (34) opposite the extremity of plunger (17). With the clutch pedal depressed, depression of the brake pedal rotates the brake pedal assembly about its shaft and by virtue of the pins (15) operating in guide slots (7) and (8) of guide plates (5) and (6) shifts the entire brake pedal assembly longitudinally of its shaft until the outer face (18) of bearing (14) contacts with the surface of segment (34) of bearing (28).

As these two surfaces are brought into engagement plunger (17) is depressed against the action of spring (20). Continued depression of the brake pedals to fully apply the service brakes actuates the extremity of plunger (17) over the surface of segment (34) until said plunger clears the shoulder (35) whereupon plunger (17) under the action of its spring is forced into overlying engagement with respect to said shoulder (35) interlocking the clutch and brake assembly so that with the clutch foot of the operator on pedal (30) the clutch may be held disengaged and the service brakes applied while the brake foot of the operator is free to operate the accelerator when occasion requires.

As the clutch pedal is gradually allowed to return to normal position throwing in the clutch the service brakes are likewise gradually released with concomitant disengagement of clutch pedal assemblies due to the action of the pins (15) in their guide slots which serve to return the brake pedal assembly to its original position on the clutch control shaft.

When the brake pedal is depressed the clutch pedal being at rest the entire brake pedal assembly slides a short distance on the pedal shaft as hereinbefore stated, so as to place the end of the plunger directly in front of shoulder (35) on the clutch pedal assembly so that if the clutch pedal is depressed the end of the plunger will be engaged by the shoulder and both pedal assemblies again interlocked.

In conclusion it is evident this invention provides an extremely simple interlocking mechanism which will not in any way interfere with the normal operation of the foot pedals but which will afford a factor of safety not to be found in connection with prevailing automotive equipment and which will entirely avoid the dangers now incidental to stopping on a steep grade.

In the description and illustrated embodiment of this invention, the bearing member of the clutch assembly is keyed to shaft 2, manifestly, however, this bearing member could be loosely mounted on the shaft and connected with a clutch control arm if desirable, as shown in Figure 7 of the drawings.

Although in the foregoing certain elements have been described as best adapted to perform the functions allotted to them, nevertheless it is to be understood that various minor changes may be resorted to within the scope of the appended claims without departing from or sacrificing any of the principles of this invention.

Having described my invention, what I claim as new and wish to secure by Letters Patent is:

1. The combination with a clutch control shaft, a clutch pedal assembly keyed to the shaft to effect its rotation, a brake pedal assembly loosely mounted on the shaft and rotatably and longitudinally movable with respect thereto, means to impart longitudinal movement to the brake assembly as it is rotated about the shaft and interconnecting means in connection with the respective assemblies to effect their engagement and disengagement when both of said assemblies have been actuated to clutch releasing and brake applying positions, respectively.

2. The combination with a clutch control shaft, a clutch pedal assembly keyed to the shaft and operable to engage and disengage the clutch assembly, a brake pedal assembly loosely mounted on the shaft and rotatably and longitudinally movable with respect thereto, said assembly being adapted to control application of the service brakes, means actuating the brake assembly longitudinal of its shaft as it is rotated thereabout and cooperating means in connection with the respective assemblies to effect an interconnection therebetween when both of said assemblies have been actuated to clutch releasing and brake applying positions, respectively.

3. The combination with a clutch control shaft, a clutch pedal assembly including a bearing member keyed to the shaft, a foot pedal carried by said bearing member; of a brake pedal assembly including a bearing member loosely mounted on the shaft and rotatably and longitudinally movable with respect thereto, means for imparting longitudinal movement to the brake pedal assembly as the latter is operated about the shaft, a plunger member yieldably supported by the brake pedal assembly and means carried by the clutch pedal assembly for engagement with said plunger when both assemblies have been actuated to clutch releasing and brake applying position, respectively.

4. The combination with a clutch control shaft of a clutch pedal assembly including a bearing member positioned upon and keyed to the shaft, a foot pedal carried by said member, a brake pedal assembly comprising a bearing member loosely mounted on the shaft and rotatably and longitudinally movable with respect thereto and a foot pedal carried by said member; of a yieldable plunger mounted in the bearing member of said brake assembly and having one extremity projecting therefrom, an abutment in connection with the clutch pedal assembly to engage the extended extremity of the plunger when the brake pedal assembly has been longitudinally moved along its shaft into contact with the clutch pedal assembly to interlock the assemblies as they are operated to release the clutch and apply the service brakes.

5. The combination with clutch and brake pedal assemblies, each operable independently of the other about a common axis; of means to shift the brake pedal assembly longitudinally of its axis as it is rotated thereabout, and additional means in connection with the respective assemblies to automatically and temporarily interlock the latter when the brake pedal assembly has been shifted longitudinally and both assemblies rotated to a predetermined extent about their axis whereby the movement of the brake pedal may be controlled by that of the clutch pedal.

6. The combination with clutch and brake pedal assemblies, each operable independently of the other about a common axis; of means to shift the brake assembly longitudinally of its axis as it is rotated thereabout and additional means in connection with the respective assemblies to automatically and temporarily interlock the latter when the brake assembly has been shifted longitudinally and both assemblies rotated to a predetermined extent about their axis, such means including an abutment carried by the clutch assembly and a retractible plunger shiftable longitudinally by rotation of the brake assembly to engage the abutment and thereafter permit movement of the clutch assembly to control that of the brake pedal.

SIDNEY R. HINDS.